(No Model.)

J. F. GILLILAND.
COMBINED WASHER AND LINCHPIN.

No. 320,058. Patented June 16, 1885.

WITNESSES.
Chas N. Leonard,
E. W. Bradford,

INVENTOR.
James F. Gilliland,
PER
C. Bradford.
ATTORNEY.

N. PETERS, Photo-Lithographer, Washington, D. C.

UNITED STATES PATENT OFFICE.

JAMES F. GILLILAND, OF INDIANAPOLIS, INDIANA.

COMBINED WASHER AND LINCHPIN.

SPECIFICATION forming part of Letters Patent No. 320,053, dated June 16, 1885.

Application filed March 27, 1885. (No model.)

*To all whom it may concern:*

Be it known that I, JAMES F. GILLILAND, of the city of Indianapolis, county of Marion and State of Indiana, have invented certain new and useful Improvements in Combined Washers and Linchpins, of which the following is a specification.

My said invention consists in a washer having two slots, thus leaving a central tongue adapted to extend down through a hole in the shaft or axle, while the slots pass over the sides of said shaft or axle, and a catch adapted to swing around the shaft or axle across the tongue, and cover the open end of said slots, thus holding the device in place on the shaft.

Figure 1:
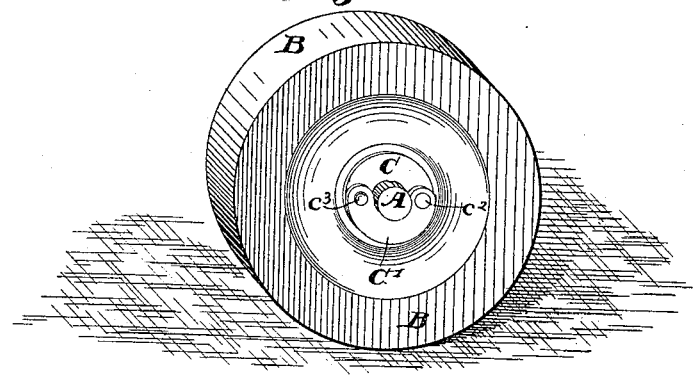
Figure 2:
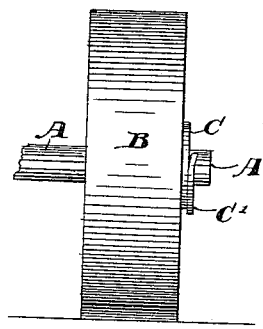
Figure 3:
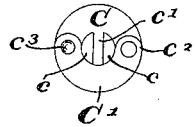

Referring to the accompanying drawings, which are made a part hereof, and on which similar letters of reference indicate similar parts, Figure 1 is a perspective view of an axle and truck provided with my invention; Fig. 2, a side elevation of the same; Fig. 3, a plan view of my device separately, the spring-catch being closed as in operative position; and Fig. 4, a similar view, said spring-catch being opened or swung back.

In said drawings, the portions marked A represent the axle or shaft; B, the truck or wheel, and C my improved device.

The axle A and truck B are not peculiar, and need no special description. Said axle is provided with a hole, as is common where a linchpin is employed as a fastening to hold the truck or wheel in place.

The device C, as before indicated, is in general form a washer; but instead of having the ordinary round hole in the center, slots $c\ c$ are formed in one side and extend to a point which corresponds to the opposite side of the ordinary round hole, as shown, leaving a tongue, $c'$, between them, which is adapted to pass through the hole in the axle, and thus serve as a linchpin, the outer or remaining portion of the device serving, as usual, for a washer, against which the truck or wheel bears.

Figure 4:
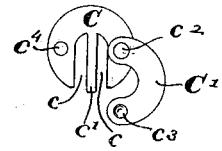

To one side of the part C is secured a catch, $C'$, by means of a pivot, $c^2$, and thus is adapted, as illustrated by Figs. 3 and 4, to be swung around across the tongue of the device, which is placed in the end of the axle, so as to hold it thereon. A small projection, $c^3$, on the other end of this catch is adapted to engage with a corresponding hole, $c^4$, in the opposite side of the part C, to which this is pivoted, and the catch itself is preferably made of spring metal to render this engagement certain.

My combined washer and linchpin is adapted for use in many places; but the principal use for which I have designed it is upon the ends of the axles of roller-skates to hold the rolls of such skates in position, it being desirable in this class of devices to have the rolls not only securely fastened in position, but adapted to be easily removed and replaced.

Having thus fully described my said invention, what I claim as new, and desire to secure by Letters Patent, is—

1. As a new article of manufacture, a combined washer and linchpin, the main portion C of which is slotted, leaving a central tongue, and having a catch pivoted thereto adapted to be swung around to close the slots and thus secure the device in position on the axle, substantially as set forth.

2. The combination, with a wheel and axle, said axle having a hole therein, of a combined washer and linchpin, C, having a central tongue, $c'$, adapted to pass through said hole, and a catch, $C'$, adapted to be swung around to close said slots, substantially as set forth.

3. The combined washer and linchpin consisting of a main part, C, having the slots $c\ c$, with a tongue, $c'$, between them, a catch, $C'$, secured to the main part by a pivot, $c^2$, and provided with a projection, $c^3$, which is adapted to engage with the hole or depression $c^4$ in said main part C, substantially as set forth.

4. A combined washer and linchpin, the main portion of which is formed of sheet metal into which slots $c\ c$ are cut, leaving a central tongue, and a catch secured to said main portion by a pivot which passes through both transversely thereof and is adapted to be swung around and close the slots, thus completely inclosing the shaft when in closed position, substantially as shown and specified.

In witness whereof I have hereunto set my hand and seal, at Indianapolis, Indiana, this 23d day of March, A. D. 1885.

JAMES F. GILLILAND. [L. S.]

In presence of—
 E. W. BRADFORD,
 CHARLES L. THURBER.